US007237241B2

(12) United States Patent
Chan et al.

(10) Patent No.: US 7,237,241 B2
(45) Date of Patent: Jun. 26, 2007

(54) METHODS AND SYSTEMS FOR MANAGING ACCESS TO SHARED RESOURCES USING CONTROL FLOW

(75) Inventors: Hon Keat W. Chan, Bellevue, WA (US); Carlos Gomes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 10/602,538

(22) Filed: Jun. 23, 2003

(65) Prior Publication Data

US 2004/0261080 A1 Dec. 23, 2004

(51) Int. Cl.
*G06F 9/46* (2006.01)
(52) U.S. Cl. .................. 718/104; 718/102; 719/312
(58) Field of Classification Search ........ 711/147–149; 718/101–108; 719/312
See application file for complete search history.

(56) References Cited

U.S. PATENT DOCUMENTS

| 5,237,694 A | * | 8/1993 | Horne et al. ............... 710/200 |
| 5,375,241 A | * | 12/1994 | Walsh ....................... 719/331 |
| 2003/0061394 A1 | * | 3/2003 | Buch ......................... 709/310 |

OTHER PUBLICATIONS

Tanenbaum, Andrew S., "Operating Systems: Design and Implementation", Prentice Hall, 1987, pp. 51-109, 225-226, and 714 (plus cover and copyright page).

Budne, "Clarification desired re: instructions on KA10," http://pdp10.nocrew.org/docs/pdp6-ka10.diffs.txt, downloaded from the internet on Jan. 24, 2007, 8 pages.

Gezelter, "OpenVMS Asynchronous System Trap (AST) Internals," in *Fall 1996 US DECUS Symposium*, Session AD039, Nov. 1996, 19 pages.

"HP OpenVMS Systems Documentation," http://h71000.www7.hp.com/DOC/73final/6489/6489pro_030.html, downloaded from the internet on Jan. 24, 2007, 10 pages.

"OpenVMS User's Manual," file://C:\DOCUME~1\dhb\LOCALS~1\Temp\W7LWJDJY.htm, downloaded on Jan. 24, 2007, 17 pages.

* cited by examiner

*Primary Examiner*—Lewis A. Bullock, Jr.
*Assistant Examiner*—Anya Charles
(74) *Attorney, Agent, or Firm*—Klarquist Sparkman, LLP

(57) ABSTRACT

Computer systems have resources that are often shared by plural processes (or threads). It is often desirable to limit access to these shared resources to one process at a time. Historically locks were used in conjunction with conditional tests to provide exclusive access to a region of code or data. Instead, a global variable contains a pointer to either a protected resource, or an exchange instruction. A process exchanges its' local variable with the global variable and jumps to the location in the exchanged local variable. If the global variable had the pointer to the shared resource before the exchange, then the jump enters the protected region. If not, the jump returns to exchange variables again. As soon as the pointer to the protected resource is returned to the global variable, a next exchange and jump will access the shared resource.

24 Claims, 8 Drawing Sheets

FIG. 5

```
                        lock_sample.cpp  ←——— 502 include "lock.h"  ←——— 504 typedef class CAquireLock<CSpinLock> CAquireSpinLock;  ←——— 506

// This is the lock variable, which can be aquired.
CSpinLock m_TheLock;  ←——— 508

// This is a globally shared data variable that should be used carefully to
// avoid duplicate IDs. See code below.
long GlobalTransactionID = 0;  ←——— 510 void ProcessBankTransaction  ←——— 512
(
   BankTransaction * pTransaction
)
{
   // First aquire the lock so I can process the bank transaction
   // without conflicting with other bank transactions CAquireSpinLock lock(&m_TheLock);  ←——— 514

// Lock is now aquired, I can now process the transaction safely

// Assign transaction a unique transaction ID
   // This cant be done without a lock. Without a lock, its possible that
   // 2 different transactions could have the same transaction ID.
   GlobalTransactionID = GlobalTransactionID + 1;  ←——— 516
   pTransaction->ID = GlobalTransactionID;

// Now do more transaction processing like a withdrawl, deposit, transfer, ...
   // ... code omitted for simplicity // Done with the code
   // Compiler will insert a call to the CAquireSpinLock destructor, which will
   // unlock the aquired lock (m_TheLock)
      return;  ←——— 518
}
```

FIG. 6

```
                                    lock.h
void __declspec(naked) WaitForLock()  ◄──── 614
{
    __asm
    {
        // only 2 destinations: Spin or Aquired. Aquired is the only way
        // to get out of here. Spin just keeps looping until lock is aquired.

push    ebx  ◄──── 616
        mov     ebx, [esp + 8]  ◄──── 618

Spin:  ◄──── 620
        mov     eax, Spin  ◄──── 622
        lock xchg  eax, dword ptr [ebx]  ◄──── 624
        jmp     eax  ◄──── 626
    }
}
inline void __declspec(naked) Aquired()  ◄──── 628
{
    __asm
    {
        pop     ebx  ◄──── 630
        ret     4  ◄──── 632
    }
}
class CSpinLock
{
public:
    CSpinLock()  ◄──── 602
    {
        // Initial lock variable to Aquired function. When the Aquired function
        // is executed, then this class has aquired the lock.
        m_pv = Aquired;  ◄──── 604
    }
    void Lock()  ◄──── 606
    {
        void ** ppv = &m_pv;  ◄──── 608

__asm
        {              610
            push  ppv          // pass pointer to lock variable to WaitForLock.
            call  WaitForLock  // call function to wait until lock is aquired
        }                  612
    }
}
```

FIG. 7

```
    void Unlock()  ◄——718
    {
      void ** ppv = &m_pv;
      __asm
      {
          push  ebx   ◄——720
          mov   ebx,   ppv    ◄——722
          mov   eax,   Aquired ◄——724
          lock xchg eax,   [ebx] ◄——726
          pop   ebx   ◄——728
      }
    }
protected:
    void * m_pv;   ◄——730
};
template <class CLockWorker>
class CAquireLock
{
public:
    CAquireLock(CLockWorker * plock)  ◄——702
    {
      m_plock = plock;  ◄——704
      Lock();  ◄——706
    }
    ~CAquireLock()  ◄——710
    {
      Unlock();  ◄——712
      m_plock = NULL;
    }
    void Lock()
    {
      m_plock->Lock();  ◄——708
    }
    void Unlock()  ◄——714
    {
      m_plock->Unlock();  ◄——716
    }
protected:
    CLockWorker * m_plock;
};
```

METHODS AND SYSTEMS FOR MANAGING ACCESS TO SHARED RESOURCES USING CONTROL FLOW

TECHNICAL FIELD

The technical field relates to a computerized methods and systems for managing access to shared resources using control flow.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer systems have resources that are often shared by plural processes or threads. It is often desirable to limit access to these shared resources to one process or thread at a time. For example, a lock was historically used to provide exclusive access to a region of code or data. Under such a scenario, a process or thread would test whether a lock variable was set to the locked or unlocked state. If the test indicated the unlocked state, the process would change the variable to the locked state, and proceed into the protected resources. After completing use of the protected resource, the process would change the lock variable back to the unlocked state. While the lock variable was set to the locked state, any other process or thread would have to wait before entering the protected region. These conditional test locks require comparing (testing) the lock variable and entering the protected resource when the test indicates an unlocked state.

SUMMARY

The described technologies provide methods and systems for managing access to shared resources with control flow.

In one example, a global variable contains a pointer to either a protected resource, or a wait resource. The global variable is initialized to point to the protected resource. Plural threads (or processes), attempt to obtain access to the protected resource, by jumping to an address contained in a local variable associated with the respective thread. The local variable for a thread is initialized to point to the wait resource. When a thread wants to enter the protected resource, it jumps to the wait resource. The wait resource exchanges the local variable with the global variable and then jumps to (or calls) the address in the local variable (i.e., the address received in the exchange). Since the global variable is initialized with the pointer to the protected resource, the first thread exchanging variables, obtains the pointer to the protected resource. Thus, by jumping to the address pointed to by the local variable, the thread has entered the protected resource. No other thread (or process) can enter the protected resource while the thread holds the pointer to the protected resource in its' local variable.

Upon completing use of the protected resource, the thread exchanges the local variable with the global variable. This exchange returns the pointer to the protected resource to the global variable. Once the pointer to the protected resource is returned to the global variable, then it is available for a next thread. When another thread holds the pointer to the protected resource, the global variable holds the pointer to the wait resource. Thus, if another thread exchanges for the global variable, and then jumps to the address received in the exchange, the jump returns to the wait resource. So other threads continue to wait in the wait resource. However, when the pointer to the protected region is returned to the global variable, a next waiting thread that exchanges variables, will subsequently jump to the protected region.

Interestingly, these methods and systems provide managed access to shared resources without conditional testing.

Additional features and advantages will be made apparent from the following detailed description of the illustrated embodiments, which proceeds with reference to the accompanying drawings.

BRIEF DESCRIPTION OF THE DRAWINGS

FIG. 5 is a program listing of an exemplary method for managing access to a shared resource using control flow.

FIG. 6 is a program listing of an exemplary method for managing access to a shared resource using control flow.

FIG. 7 is a program listing of an exemplary method for managing access to a shared resource using control flow.

DETAILED DESCRIPTION

EXAMPLE 1

Exemplary Memory Configuration

Figure 1:
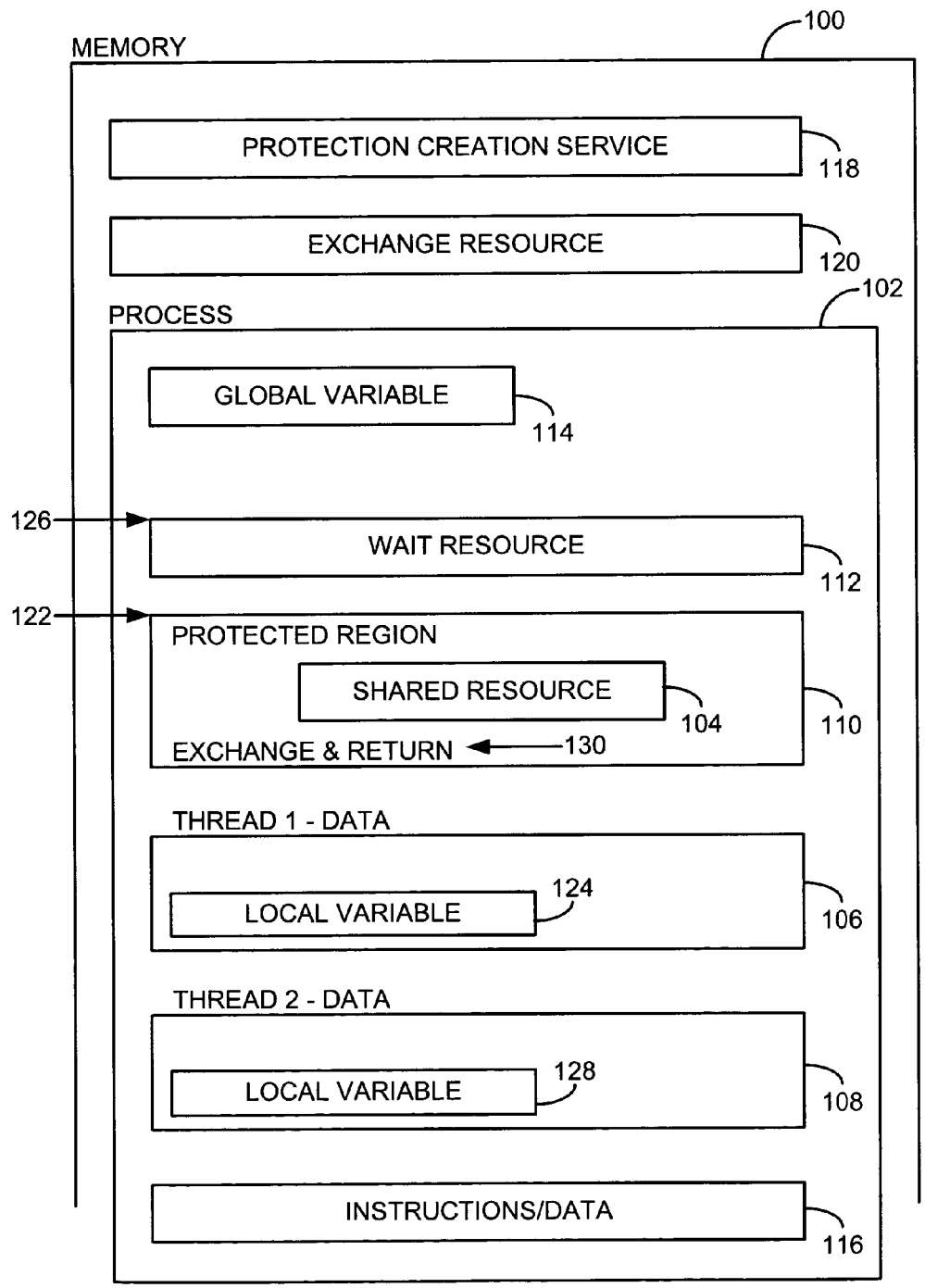
FIG. 1 is an exemplary region of memory showing an example set of code segments and data for managing access to shared resources.

FIG. 1 is an exemplary region of memory 100 showing a set of instructions and data used for managing a shared resource 104. Although shown as contiguous memory 100, the data and instructions may be dispersed through memory, and viewed by the process and threads as logical abstractions such as a stack, a heap, and other types of objects. The example memory 100 includes a process address space 102 with instructions and data. The memory 100 may be contained in RAM, ROM, buffers, registers, and/or any other computer-readable medium. Any specific instructions or data are moved through different forms of memory as useful for efficient processing. In this example, the shared resource 104 is shown within the process address space 102, but the shared resource may also be outside the process address space (not shown), such as a system resource.

The process address space 102 also includes data and instructions for two or more threads 106-108, a protected region 110 containing or providing access to the shared resource 104, a wait resource 112, a global variable 114, and other instructions and/or data 116. The memory 100 also includes a protection creation resource 118, and an exchange resource 120.

In addition to the process being created and loaded into memory for execution, a protection creation service 118 is called on to create the global variable 114. The protection creation service creates the global variable and initializes it with a pointer 122 to the protected region 110. Preferably, the protection creation service is a set of instructions that are executed atomically as one without interruption.

When a thread is created for execution, data specific to the thread is loaded into memory 106, and made available to the executing thread. For example, the thread includes a local variable 124 that is initialized with a pointer 126 to a wait resource 112.

While executing other code or instructions (e.g., 116), the thread desires to utilize a shared resource 104. The thread, desiring to utilize the shared resource 104, calls 126 the wait resource 112. The wait resource 112 has two steps. First, the wait resource calls an exchange resource 120, that exchanges the threads local variable 124, with the global variable 114. Preferably, the exchange resource is executed atomically without interruption. Second, the wait resource 112 jumps to or calls the address contained in the local variable 124.

Following this example, since the global variable 114 was initialized with a pointer 122 to the protected region 110, the exchange 120 places the pointer to the protected region into the local variable 124, so the jump causes control flow to enter the protected region. Since the thread exchanged the global variable 114 for its local variable 124, the global variable contains the pointer to the wait resource 126, while the thread with the pointer to the protected region is using the shared resource 104. In this regard, one thread executes or uses the shared resource at a time.

For example, if another thread is created, data for that thread is also loaded into memory 108 and made available to the executing thread. For example, the thread includes a local variable 128, that is initialized to a pointer 126 to the wait resource 112. Since the first thread still holds the pointer to the protected region in its local variable 124, it can't be obtained by this new thread. For example, assume that the new thread jumps to 126 (or calls) the wait resource 112 in order to obtain the shared resource. Again, the wait resource 112 exchanges the local variable in the thread 128 for the global variable 114. However, since both variables now contain the pointer 126 to the wait resource, when the wait resource jumps to the address in the local variable 128, control flow continues 126 at the wait resource 112. In this regard, one thread can be in the protected region, while one or more threads cycle in the wait resource.

Finally, when a thread exits the shared resource 104, the local variable 124 containing the pointer to the protected region 122, is exchanged 130 (e.g., the exchange resource 120 is called again) back into the global variable. Since one or more threads are cycling in the wait resource, the next thread that performs an exchange will subsequently jump to the protected region.

Thus, the arrangement allows one thread at a time into a protected resource or region of memory. Further, it is accomplished by redirecting control flow rather than performing conditional lock tests. This is especially helpful in designs that require saving the status register before executing the conditional test.

Of course, threads cycling in the wait resource (i.e., exchange-jump, exchange-jump, . . . etc.), can also call a sleep function that waits a variable time before performing the next cycle. This would help reduce bottlenecks for highly contentious shared resources.

In this example, the memory 100 is a binary image as compiled from assembly language or source code. This assumes that the compiler has compiled the source code or assembly language code into an image efficient for execution. However, prior to compilation, the program may have been arranged according to a more human understandable form such as the object oriented programming paradigm or other programming paradigm. For example, the programmers may have coded a lock object with a create lock constructor and a swap lock method. However, during compilation, those methods may be placed within the process address space 102 itself or may rely on (e.g., be linked to) system resources that provide such functionality. Many other such example arrangements of code and instructions within the binary image are acceptable, so long as they maintain the broad concepts.

For example, plural processes (or threads) exchange their associated (or local) pointer with a shared (or global) pointer visible to the plural processes. After an exchange, a process jumps to (or calls) the address in their associated pointer. If the process jumps to a protected region or shared resource, the process exchanges their associated pointer for the shared pointer upon exiting the region or resource. If the process doesn't jump to the protected region or resource, then it cycles in the exchange and jump code, until it jumps to the protected region or shared resource.

Other arrangements include the shared resource or the wait resource located outside the process address space, the associated thread local variables outside the threads address space, or the global variable outside the process address space. Thus, moving variable scope or boundaries of code labor would not avoid using the described technologies, so long as the exchange and jump (call) concept correctly manages control flow into the protected resource.

EXAMPLE 2

Exemplary Shared Resource Set-up and Support Method

Figure 2:
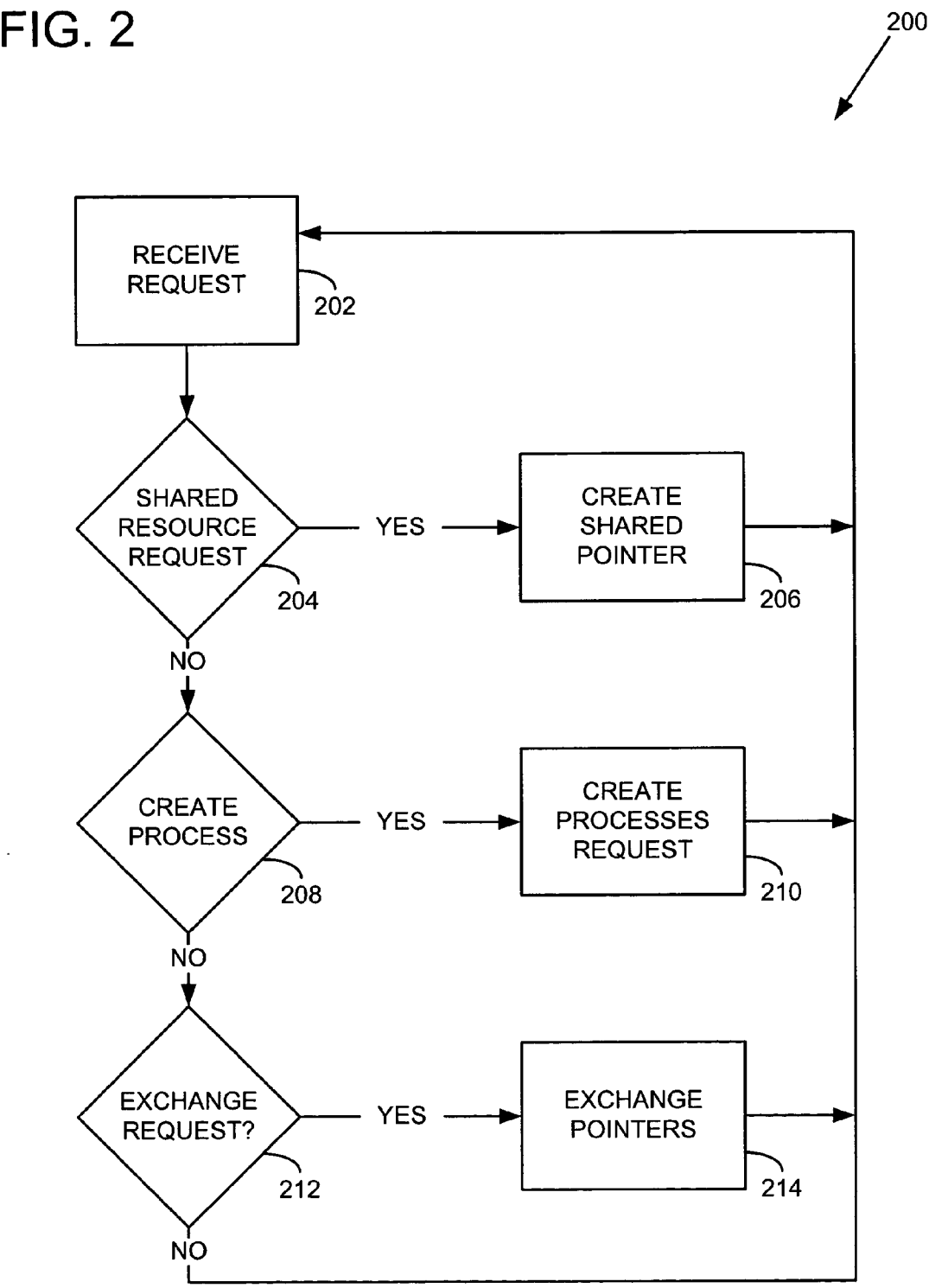
FIG. 2 is a flow chart of an exemplary method for creating a shared memory pointer and plural processes or threads.

FIG. 2 is a flow chart of an exemplary method 200 for creating a shared memory pointer and plural processes or threads. At 202, the method receives a request. At 204, if the request is a shared resource request, a shared memory location is initialized 206 with a pointer to a protected region comprising a shared resource followed by an exchange instruction.

At 208, if the request is a process or thread request, a process or thread is created 210 that includes an associated memory location with a pointer to exchange and jump instructions.

At 212, if the request is an exchange request, the method exchanges the shared memory location contents with the requesting process' or thread's associated memory location contents.

The method 200 then returns for a next request.

In one example, the method is a system service that processes or threads can utilize in order to set-up and maintain managed access to shared resources. In another example, a process may use the method to create and manage a shared resource that is utilized by several threads within the process. However, in the broadest sense, those skilled in the arts will know many uses, where a more efficient lock design will be valuable, and no particular example described herein will limit those diverse and known uses.

Once an environment is set up for receiving requests to a shared resource (e.g., 200), plural processes and/or threads will request and receive access to the shared resource as described with reference to FIG. 3.

EXAMPLE 3

Exemplary Shared Resource Request Method

Figure 3:
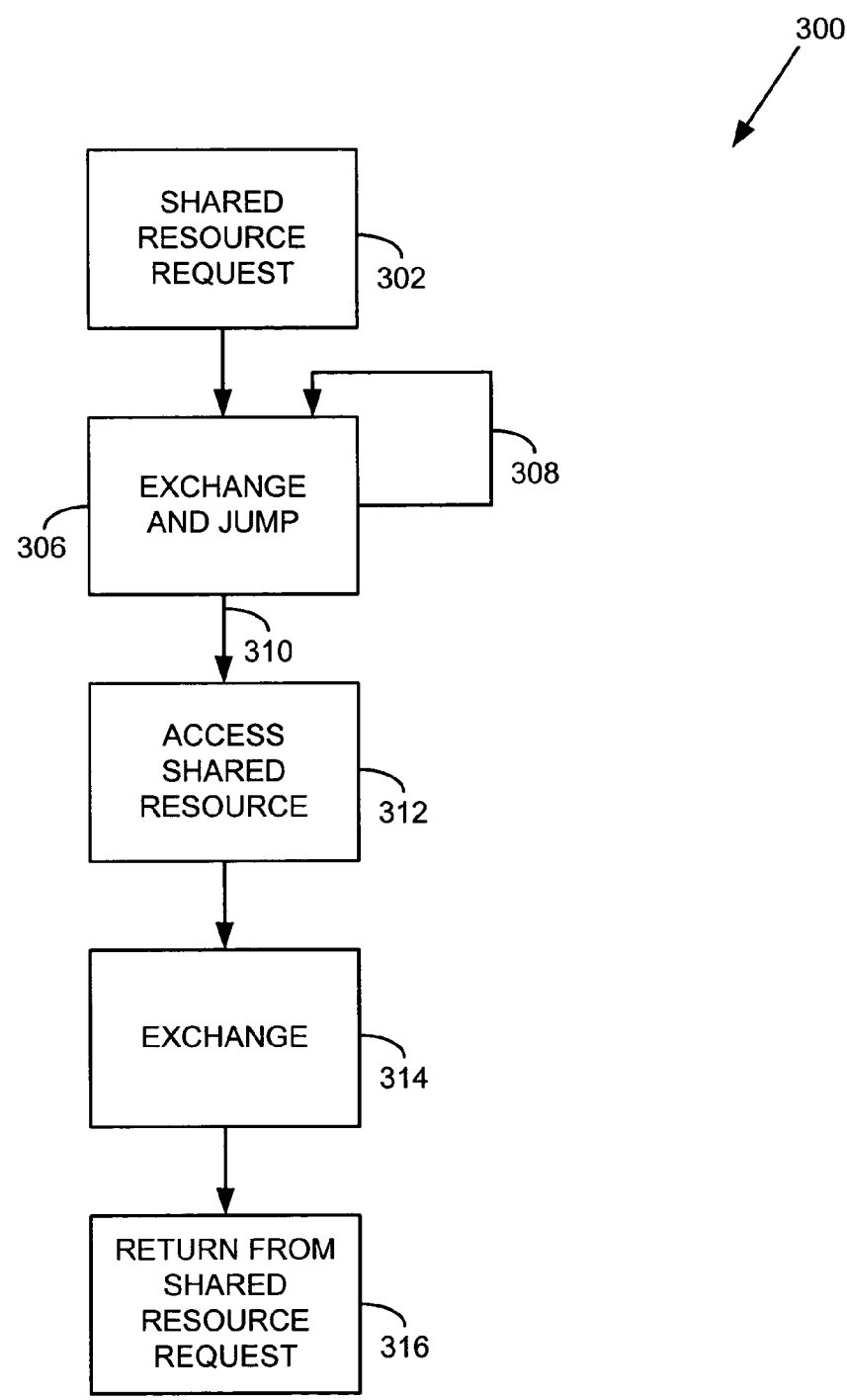
FIG. 3 is a flow chart for a method for shared resource requests and managed shared resource access.

FIG. 3 is a flow chart for a method 300 for shared resource requests and managed shared resource access.

At 302, the process or thread requests access to a shared resource and/or a protected memory region. For example, the request could be a branch or jump to an exchange instruction, or a call to an exchange method.

At 306, the method exchanges the contents of the shared memory location for the contents of an associated memory location, as discussed with reference to FIG. 2, steps 206 and 210, and then jumps to the address contained in the associated memory location. There is no conditional test. The process or thread just jumps to either the exchange and jump instructions 308, or to the shared resource 310. The shared memory location was initialized to the address of the shared resource. The associated memory location (e.g., local variable) was initialized with a pointer to the exchange instructions. Thus, a first thread performing the exchange will exchange the pointer to the shared resource into its associated memory location, and then jump 310 to the shared resource. However, if another process has already exchanged for the pointer to the shared resource, then the shared memory location contains a pointer to the exchange instruction, and the process or thread jumps 308 to the exchange and jump instructions 306.

At 312, once the process or thread has completed use of the shared resource, the method exchanges 314, its associated memory location contents (which presently holds the pointer to the shared resource), with the shared memory location contents (which presently holds a pointer to the exchange instruction). Thus, any number of processes or threads can be cycling in the exchange and jump 306 steps, but no more than one process or thread at a time holds the pointer to, and accesses the protected or managed resource 312. When the process holding (in its associated memory location) the pointer to the shared resource exchanges pointers 314, then another process or thread will find that it has jumped to the shared resource 310 after performing the exchange 304.

In one example, a memory location can be associated with a process or thread without requiring it to be a local variable.

At 316, the process or thread returns from the shared resource request. After the exchange 314, the shared memory location contains the pointer to the shared resource, and the next process or thread that performs the exchange and jump 306, will access the shared resource 312.

EXAMPLE 4

Exemplary System

Figure 4:
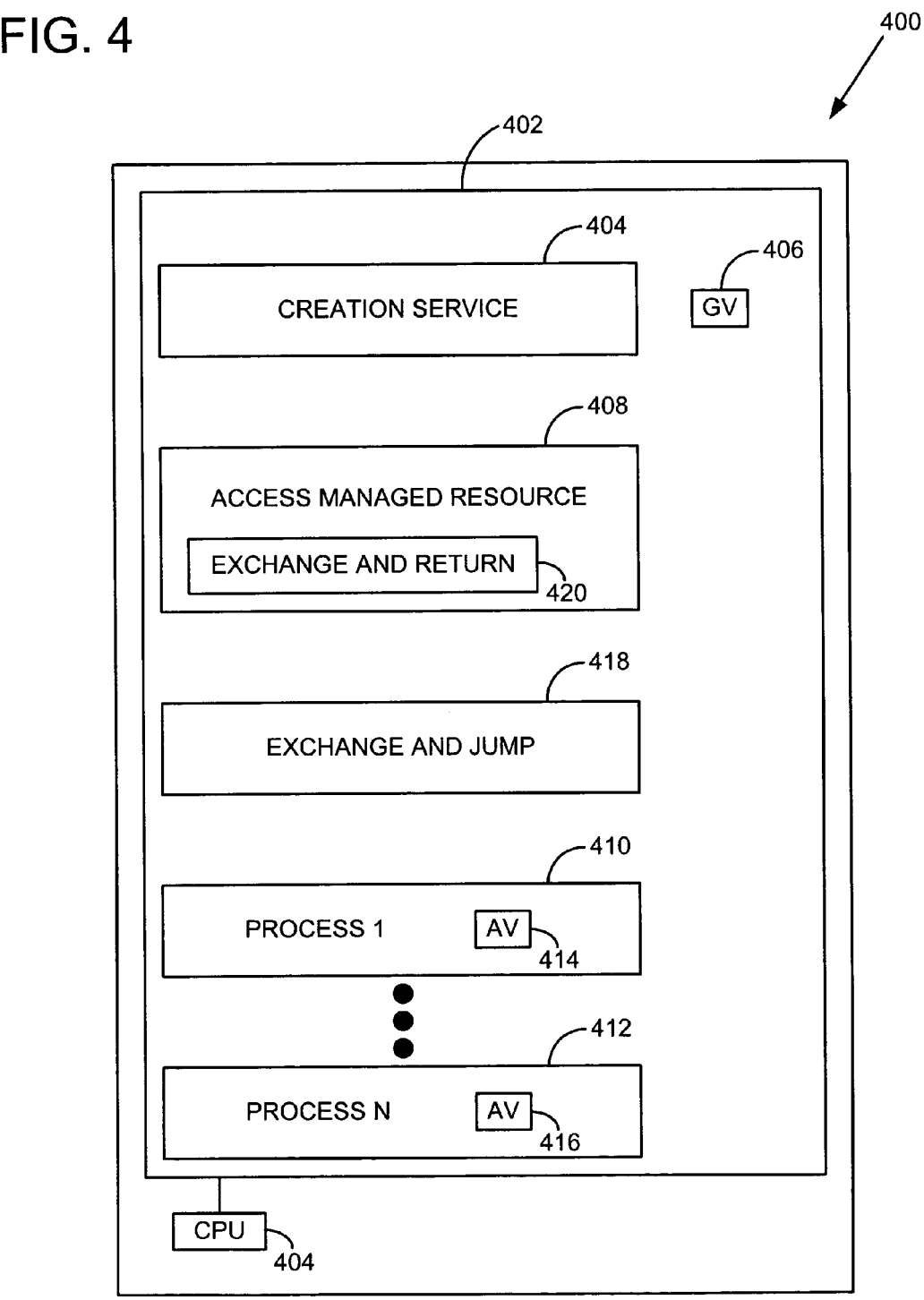
FIG. 4 is a block diagram of an exemplary system for managing access to a shared resource.

FIG. 4 is a block diagram of an exemplary system for managing access to a shared resource. The system 400 includes memory 402 and a central processing unit 404.

The system includes a creation service 404 that includes a method that creates a global variable associated with an access managed resource 408. The types of access managed resources are well known in the computing arts, and were historically protected by conditional test locks, semaphores, etc. Preferably, the global variable will be created in a series of uninterrupted steps (i.e., atomic set of instructions). The global variable is initialized with a starting address for obtaining access to the shared resource.

The creation service also includes a method that loads two or more processes and/or threads 410-412 for execution. Each process or thread is initialized with an associated variable 414-416, containing a pointer to exchange and jump instructions 418.

A presently executing process (e.g., 410) requests access to the access managed resource by jumping to the exchange and jump instructions 418. The exchange instruction exchanges that processes associated variable 414 for the global variable 406, and then jumps to the address stored in its associated variable 414. Thus, if before the swap, the global variable contained a pointer to the access managed resource 408, the jump 418 continues execution in the resource 408 after the exchange 418. However, if the global variable contained a pointer to the exchange and jump instructions 418, the jump 418 continues execution at the exchange instruction 418.

If the global variable held the pointer to the access managed resource 408, then the exchange caused the global variable to contain a pointer to the exchange and jump instruction. While a process or thread holds the pointer to the access managed resource, then any other process or thread requesting access via the exchange and jump instructions 418, cycles in the exchange and jump instructions.

The process or thread that holds the pointer to the access managed resource in its associated variable, exchanges 420 the pointer back into the global variable before returning from the access managed resource request.

EXAMPLE 5

Exemplary Program Listing

FIGS. 5-7 is a program listing 500, 600, 700 of an exemplary method for managing access to a shared resource using control flow.

The lock sample program 502 includes 504 resources in another file called "lock.h" as shown in FIGS. 6-7.

The code begins 506 by defining an instance of the CAcquireLock class, and that instance is named CAcquire-SpinLock.

Next the program creates an instance of the CSpinLock class called m_TheLock 508. As shown in FIG. 6, the constructor method 602 for this class sets a memory pointer value called m_pv to the Acquired function 604. The program then initializes a shared resource to the zero value 510, and a process method 512 begins attempting access to the protected shared resource 514. In this example, until the lock is acquired, program flow cannot continue and access the protected shared resource 516.

The CAcquireSpinLock instance 514 receives the m_TheLock 508 instance as input. Thus, the CAcquireLock constructor 702 receives m_TheLock as input. First m_plock is set to m_TheLock 704 and then a call is made to Lock( ) 706 which is defined locally as a function call to the Lock( ) function in m_TheLock 708, also called Lock( ) 606. As shown, the Acquired address is stored in a local variable 608, called ppv (a pointer to a pointer). The Lock( ) function 606 then pushes the Acquired pointer onto the stack 610 and calls the WaitForLock function 612, defined at 614.

WaitForLock( ) 614 saves the ebx register 616, and moves the Acquired pointer into the ebx register 618. WaitForLock( ) 614 then moves the SPIN address 620 into the eax register 622, and exchanges the contents of ebx (i.e., the Acquired address) for the SPIN address 624. The method 614 then jumps to the memory location contained in the eax register 626, which is the Acquired 628 method.

The Acquired method 628 simply restores the ebx register 630 to its previous state as saved at instruction 616. Acquired 628 then returns 632 to execute in the protected region 516. Notice that if another thread or process tries to obtain the Acquired pointer, it will be unavailable since the saved ebx register on the stack frame now contains 624 the SPIN 620 address instead of the Acquired address 628. Thus, the protected memory location can be altered 516 without corruption by plural processes or threads.

Finally, notice that when the method has completed processing in the protected region, and the ProcessBankTransactions returns 518, the compiler will have inserted automatically, a call to the CAcquireSpinLock deconstructor called ~CAcquireLock( ) 710. This results in a local call 712 to Unlock( ) 714 which calls the m_plock→Unlock( ) 716, as defined at 718. The UnLock( ) function 718 first saves the ebx register 720, then moves the m_pv pointer (which now contains the SPIN pointer) into the ebx register 722. Next the method 718 moves the pointer to Acquired 628 into the eax register 724 and exchanges the Acquired pointer for the SPIN pointer 726, before restoring the ebx register 728. Thus, upon exiting the protected region 518, the compiler inserted method (not shown) calls the deconstructor function 710, which replaces the Acquire pointer back into the CSpinLock class (i.e., a global variable in m_TheLock) where it can be obtained by a next process or thread calling CAcquireSpinLock( ) 514.

The program listing example 500, 600, 700 implements the exchange and jump technologies using function calls in the control flow. In particular, this example is interesting because when the protected area is exited 518, the deconstructor function returns to the CSpinLock class the pointer to the Acquired function 628, which allows a next thread or process performing an exchange and jump 624, 626 to enter the protected region via the Acquired function 628. In that respect, Acquired is considered a pointer to the protected region.

EXAMPLE 6

Computing Environment

Figure 8:
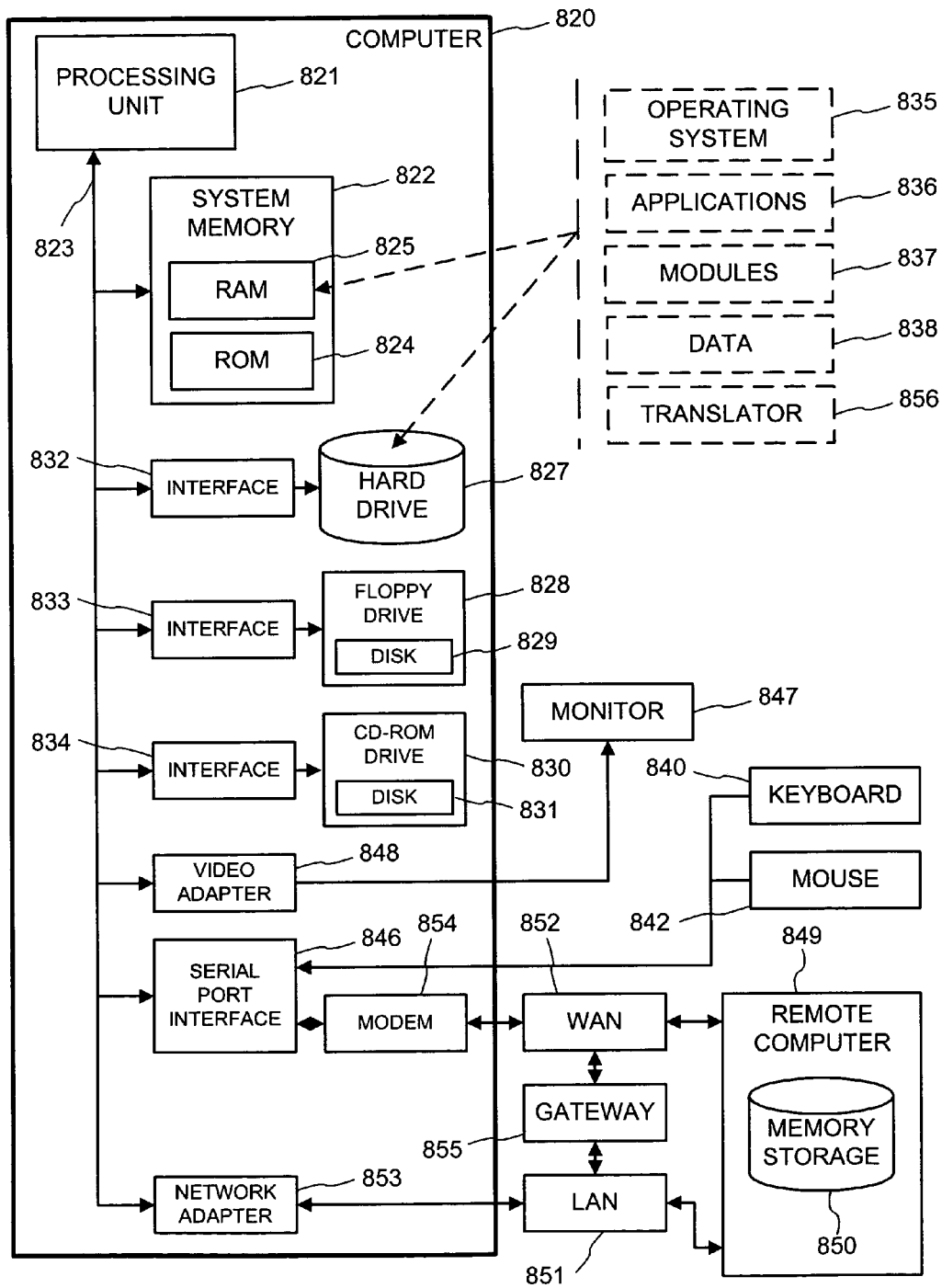
FIG. 8 is a block diagram of a distributed computer system implementing the described technologies.

FIG. 8 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc., that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 8, an exemplary system for implementation includes a conventional computer 820 (such as personal computers, laptops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838; in addition to an implementation 856. A user may enter commands and information into the computer 820 through a keyboard 840 and pointing device, such as a mouse 842. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated. The logical connections depicted include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computers may be used.

ALTERNATIVES

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which these principles apply, it should be recognized that the detailed embodiments are illustrative only and should not be taken as limiting the broader scope of this disclosure represents to those skilled in the arts. Rather, we claim all that comes within the scope and spirit of the following claims and equivalents thereto.

The invention claimed is:

1. A method comprising:
    executing an exchange function comprising exchanging an address contained in a local variable with an address in a global variable for an executing first requestor, wherein there are plural requestors in contention for the shared resource;
    jumping to the address in the local variable wherein the address in the local variable points to the exchange function address when one of the plural requestors is accessing the shared resource or to a shared resource address when the shared resource is not otherwise being accessed; such that a single requestor uses the shared resource at a time; and
    executing the exchange function after accessing the shared resource.

2. The method of claim 1 wherein the exchange function is a method of a class including a property comprising the global variable.

3. The method of claim 1 wherein the plural requestors are plural multi-tasking processes.

4. The method of claim 1 wherein the plural requestors are plural time-sharing threads.

5. The method of claim 1 wherein the local variable is associated with a process.

6. The method of claim 1 wherein the local variable is associated with a thread.

7. The method of claim 1 wherein the local variable is a property of a class associated with a thread.

8. The method of claim 1 wherein the exchange function is a method of a class including a property comprising the local variable.

9. The method of claim 1 wherein the plural requestors are plural child threads of a process in contention for the shared resource.

10. The method of claim 9 wherein the child threads each include a local variable, and the process includes the global variable.

11. The method of claim 1 wherein the exchange function is executed as an atomic unit.

12. A computer-readabic medium comprising instructibns executed by a processor to perform the method of claim 1.

13. A computer-readable medium including instructions executed by a processor to:
    create a global variable initialized with an address of a shared resource;
    create plural threads each including a local variable initialized with an address of an exchange function;
    the exchange function being called by the plural threads td exchange an address in a calling thread's local variable with an address in the global variable;
    after the calling thread calls the exchange function, transferring control to an address in the calling thread's local variable wherein the address in the local variable points to the address of the exchange function or to the address of the shared resource; and
    the exchange function being called by the calling thread after the calling thread accesses the shared resource;
    wherein the plural threads are in contention forte shared resource, and wherein the address in the calling thread's local variable points to the shared resource when the shared resource is not otherwise being accessed, such that one thread uses' the shared resource at a time.

14. The computer-readable medium of claim 13 wherein the function for creating the global variable further comprises creating as an atomic unit.

15. The computer-readable medium of claim 13 wherein the shared resource is a memory location.

16. The computer-readable medium of claim 13 wherein the exchange function further comprises calling and returning from a sleep function before exchanging variables.

17. The method of claim 16 wherein the sleep function waits a variable time.

18. The computer-readable medium of claim 13 wherein transferring control to the address in the thread's local variable transfers control to one of the exchange function or the shared resource; and
    execution of the thread continues at the transferred location.

19. A computer system comprising:
    a processor coupled to memory comprising a global variable;
    a shared resource;
    the global variable initialized with an address of the shared resource;
    an exchange function for exchanging contents of the global variable with contents of local variables;
    plural units of execution each comprising:
        an associated local variable initialized with an address of the exchange function,
        code for calling the exchange function to exchange contents of the global variable with contents of a local variable,
        code for, after calling the exchange function, jumping to an address contained in its associated local variable wherein the address points to the address of the exchange function or to the address of the shared resource, wherein the address points to the address of the shared resource only when the shared resource is not otherwise being accessed, and code for executing the exchange function after accessing the shared resource.

20. The computer system of claim 19 wherein said plural units of execution are threads, and a first thread includes code for, after executing the exchange function, jumping to the address accessing the shared resource, and before the first thread exits the shared resource, the computer system includes code for transferring control of the processor to a second thread, and the second thread includes code for, upon executing the exchange function, jumping to the address of and cycles in the exchange function.

21. The computer system of claim 20 wherein after control transfers to the first thread, and after the first thread exits the shared resource and executes the exchange function, and after control of the processor transfers to the second thread, the second thread includes code for executing the exchange function and jumping to the address accessing the shared resource.

22. The computer system of claim 19 wherein the exchange function is a method of a class including a property comprising the global variable.

23. The method of claim 19 wherein the code or executing the exchange function after accessing the shared resource allows another unit o execution to access the shared resource.

24. The method of claim 19 wherein the local variable address points to the address of the exchange function when the shared resource is being accessed.

* * * * *